(12) United States Patent
Aylmore et al.

(10) Patent No.: US 9,522,491 B2
(45) Date of Patent: Dec. 20, 2016

(54) SYSTEMS FOR FORMING AGGREGATE MATERIALS FROM HEAT FUSABLE POWERED MATERIALS

(71) Applicant: Simpet Holdings LLC, Camden, DE (US)

(72) Inventors: Peter Aylmore, Riga (LV); Simon Wiper, Dilton Marsh Washbury (GB)

(73) Assignee: Simpet Holdings LLC, Camden, DE (US)

( * ) Notice: Subject to any disclaimer, the term of this patent is extended or adjusted under 35 U.S.C. 154(b) by 42 days.

(21) Appl. No.: 14/332,487

(22) Filed: Jul. 16, 2014

(65) Prior Publication Data

US 2014/0327167 A1 Nov. 6, 2014

Related U.S. Application Data

(63) Continuation of application No. 13/246,327, filed on Sep. 27, 2011, now Pat. No. 8,801,414, which is a
(Continued)

(30) Foreign Application Priority Data

Mar. 25, 2010 (GB) .................................. 1005058.1

(51) Int. Cl.
*B29C 44/60* (2006.01)
*B29C 43/00* (2006.01)
(Continued)

(52) U.S. Cl.
CPC ............. *B29C 44/60* (2013.01); *B29C 43/003* (2013.01); *B29C 43/203* (2013.01);
(Continued)

(58) Field of Classification Search
CPC ............. B29C 44/0461; B29C 44/0469; B29C 44/445; B29C 44/60; B29C 44/585; B29C 44/586
(Continued)

(56) References Cited

U.S. PATENT DOCUMENTS 3,642,400 A   2/1972   Theodorsen
4,008,029 A   2/1977   Shokite
(Continued)

FOREIGN PATENT DOCUMENTS

CN   101480856 A   7/2009
DE      1271379 B   6/1968
(Continued)

OTHER PUBLICATIONS

DE 10 2009 028 987 A1 German to English machine translation.*
(Continued)

*Primary Examiner* — Alison L Hindenlang
*Assistant Examiner* — Lawrence D Hohenbrink, Jr.
(74) *Attorney, Agent, or Firm* — Dinsmore & Shohl LLP (57) ABSTRACT

In one embodiment, a system for forming aggregate materials may include a lower open-topped mold, an upper mold, an actuation assembly, a heating system, a pressure sensor, and a controller. The lower open-topped mold can receive a heat moldable material that can include a foaming agent. The lower open-topped mold can contact the heat moldable material and the upper mold can contact the heat moldable material. The controller can execute machine readable control logic to cause the actuation assembly to generate relative outward motion at an expansion rate. The foaming agent can expand the heat moldable material when heated. During outward motion, the lower open-topped mold can maintain close contact with the heat moldable material, and the upper mold can maintain close contact with the heat moldable material. The expansion rate of the relative outward motion can be based upon a pressure signal indicative of back pressure.

17 Claims, 6 Drawing Sheets

Related U.S. Application Data continuation-in-part of application No. 12/960,028, filed on Dec. 3, 2010, now abandoned.

(51) Int. Cl.

| | |
|---|---|
| *B29C 43/20* | (2006.01) |
| *B29C 44/44* | (2006.01) |
| *B29C 44/58* | (2006.01) |
| *B29C 44/04* | (2006.01) |
| *B29C 43/02* | (2006.01) |
| *B29C 43/36* | (2006.01) |
| *B29K 105/00* | (2006.01) |
| *B29K 105/26* | (2006.01) |

(52) U.S. Cl.
CPC ........ *B29C 44/0461* (2013.01); *B29C 44/445* (2013.01); *B29C 44/0469* (2013.01); *B29C 44/585* (2013.01); *B29C 44/586* (2013.01); *B29C 2043/023* (2013.01); *B29C 2043/3623* (2013.01); *B29K 2105/251* (2013.01); *B29K 2105/26* (2013.01)

(58) Field of Classification Search
USPC ... 264/45.2, 45.3, 45.4, 46.4, 40.5; 425/149, 425/150, DIG. 4
See application file for complete search history.

(56) References Cited

U.S. PATENT DOCUMENTS

| | | | |
|---|---|---|---|
| 4,734,231 A | 3/1988 | Morita et al. | |
| 4,781,479 A | 11/1988 | Hirano | |
| 5,693,273 A | 12/1997 | Wolbrom | |
| 6,180,203 B1 | 1/2001 | Unkles | |
| 6,220,842 B1 | 4/2001 | Kamiyama et al. | |
| 6,946,089 B2 | 9/2005 | Mizouchi et al. | |
| 2005/0202253 A1 | 9/2005 | Grafenauer | |
| 2006/0003044 A1* | 1/2006 | DiNello | B29C 41/18 425/412 |
| 2010/0237525 A1* | 9/2010 | Fujita | B29C 44/428 264/40.5 |
| 2012/0211912 A1 | 8/2012 | Kawaguchi et al. | |

FOREIGN PATENT DOCUMENTS

| | | | | |
|---|---|---|---|---|
| DE | 4406039 C1 | 3/1995 | | |
| DE | 102009028987 A1 * | 4/2011 | ........... | B29C 44/585 |
| EP | 1162051 A2 | 12/2001 | | |
| EP | 1375129 A2 | 1/2004 | | |
| EP | 1396324 A2 | 3/2004 | | |
| EP | 1431020 A1 | 6/2004 | | |
| EP | 1690662 A1 | 8/2006 | | |
| EP | 1967345 A1 | 9/2008 | | |
| GB | 1327028 A | 8/1973 | | |
| JP | 10315258 A | 12/1998 | | |
| JP | 2003112329 A | 4/2003 | | |
| WO | 02062550 A1 | 8/2002 | | |
| WO | 2004030888 A1 | 4/2004 | | |
| WO | 2005090041 A2 | 9/2005 | | |
| WO | 2006010520 A1 | 2/2006 | | |
| WO | 2006114632 A2 | 11/2006 | | |

OTHER PUBLICATIONS

International Search Report, Application No. PCT/GB2011000395, 3 Pages, Jun. 20, 2011.
International Search Report and Written Opinion regarding International application No. PCT/US2012/057234, dated Feb. 14, 2013.
International Preliminary Report on Patentability pertaining to International Application No. PCT/US2012/057234, dated Apr. 1, 2014.

* cited by examiner

SYSTEMS FOR FORMING AGGREGATE MATERIALS FROM HEAT FUSABLE POWERED MATERIALS

CROSS-REFERENCE TO RELATED APPLICATIONS

This application is a continuation U.S. patent application Ser. No. 13/246,327, filed Sep. 27, 2011, which is a continuation-in-part of U.S. patent application Ser. No. 12/960,028 filed Dec. 3, 2010, which itself claims priority to United Kingdom GB 1005058.1 filed on Mar. 25, 2010. All of the above applications are incorporated by reference herein in their entirety.

TECHNICAL FIELD

The present specification generally relates to systems for forming aggregate materials from heat fusable powdered materials and, more specifically, to systems for forming aggregate materials from heat fusable powdered materials including a foaming agent.

BACKGROUND

There are a number of known processes for forming plastics materials into the required shapes for making relatively small articles, such as injection molding, but such processes become progressively more unwieldy, and the associated equipment becomes much more expensive, when it is required to make relatively large panels such as building panels suitable for use as partitions, for example.

It is known to produce composite panels based on fibrous materials by forming a fiber layer or mat and then applying outer layers of expandable phenol resin and hot-pressing the assembly to consolidate it. Such a method of forming boards is described in U.S. Pat. No. 4,734,231 (Morita et al). JP2003112329 discloses a similar kind of board comprising a core of mixed carbon material and phenol resin powder, and a surface material comprising mixed solid phenol resin and chaff or straw, which is formed by compressing the mixtures and heating to cross-link the phenol resin. However, panels including such fibrous materials may not be sufficiently dense or strong for general building or construction purposes, and it is also difficult to achieve a smooth finish on the outer surface.

Furthermore, if it is desired to utilize ground-up recycled waste material (for example) to make a more solid core, it is difficult to make a strong integral structure without employing a multi-stage process in which the core material is first combined with a binding material. This is because the thermoplastic material of the outer layer may not penetrate the core layer sufficiently to bind it together.

It is also known to make structural panels from molded material, by separately forming relatively thin panels from a first, more fine grained material so as to provide a relatively well finished "skin", and then arranging a pair of the relatively thin panels in a suitable mold or former, with a space between them in which another plastics material is formed into a foam, so as to provide a composite structure which is relatively strong, and may also be relatively coarse grained or contain a large volume of voids, so as to provide the resulting composite structure with good insulating qualities.

As an alternative to plastics or molded materials for the external skins, of course, sheets of metal or other suitable sheet material may be utilized, but in any case the formation of such panels by conventional methods tends to involve a relatively slow and cumbersome multi-stage process, because of the necessity to pre-form some components and then to manipulate them into the required arrangement for forming the final structure. Where it is required to manufacture relatively large structural panels, for instance, sizes such as 2.4 m×1.2 m, it is consequently expensive to automate such known systems because of the need for complex handing equipment.

Accordingly, a need exists for alternative systems for forming aggregate materials from heat fusable powdered materials.

SUMMARY

In one embodiment, a system for forming aggregate materials may include a lower open-topped mold, an upper mold, an actuation assembly, a heating system, a pressure sensor, and a controller. The lower open-topped mold can receive a heat moldable material that can include a foaming agent. The upper mold can cooperate with the lower open-topped mold to form an enclosure. The actuation assembly can be coupled to the lower open-topped mold, the upper mold, or both to generate relative inward motion between the lower open-topped mold and the upper mold and relative outward motion between the lower open-topped mold and the upper mold. The heating system can be in thermal communication with the lower open-topped mold and the upper mold. The pressure sensor can be operably coupled to the lower open-topped mold, the upper mold, or both. The pressure sensor can transmit a pressure signal indicative of back pressure provided by the heat moldable material. The controller can be communicatively coupled to the actuation assembly and the heating system. When the heat moldable material is received by the lower open-topped mold, the controller can execute machine readable control logic to generate relative inward motion of the lower open-topped mold and the upper mold with the actuation assembly to enclose the heat moldable material. The lower open-topped mold can contact the heat moldable material and the upper mold can contact the heat moldable material. The controller can execute machine readable control logic to heat the lower open-topped mold and the upper mold with the heating system to a foaming temperature. The foaming temperature can fuse the heat moldable material and activate the foaming agent. The controller can execute machine readable control logic to receive the pressure signal from the pressure sensor. The controller can execute machine readable control logic to cause the actuation assembly to generate relative outward motion at an expansion rate. The foaming agent can expand the heat moldable material. During outward motion, the lower open-topped mold can maintain close contact with the heat moldable material, and the upper mold can maintain close contact with the heat moldable material. The expansion rate of the relative outward motion can be based upon the pressure signal.

In another embodiment, a system for forming aggregate materials may include a lower open-topped mold, an upper mold, an actuation assembly, a heating system a pressure sensor, and a controller. The lower open-topped mold can receive a heat moldable material. The heat moldable material may include a lower layer and an upper layer of relatively fine grain material, and a core layer of relatively coarse grain material disposed between the lower layer and the upper layer, the core layer may include a foaming agent. The upper mold can cooperate with the lower open-topped mold to form an enclosure. The actuation assembly can be coupled to the lower open-topped mold, the upper mold, or both to generate relative inward motion between the lower open-topped mold and the upper mold and relative outward motion between the lower open-topped mold and the upper mold. The heating system can be in thermal communication with the lower open-topped mold and the upper mold. The pressure sensor can be operably coupled to the lower open-topped mold, the upper mold, or both. The pressure sensor can transmit a pressure signal indicative of back pressure provided by the heat moldable material. The controller can be communicatively coupled to the actuation assembly and the heating system. When the heat moldable material is received by the lower open-topped mold, the controller can execute machine readable control logic to generate relative inward motion of the lower open-topped mold and the upper mold with the actuation assembly to enclose the heat moldable material. The lower open-topped mold can contact the heat moldable material and the upper mold can contact the heat moldable material. The controller can execute machine readable control logic to heat the lower open-topped mold and the upper mold to a pre-heat temperature with the heating system. The pre-heat temperature can fuse the upper layer and/or the lower layer of the heat moldable material and not activate the foaming agent. The controller can execute machine readable control logic to heat the lower open-topped mold and the upper mold from the pre-heat temperature to a foaming temperature with the heating system. The foaming temperature can activate the foaming agent. The controller can execute machine readable control logic to receive the pressure signal from the pressure sensor. The controller can execute machine readable control logic to generate relative outward motion of the lower open-topped mold and the upper mold at an expansion rate with the actuation assembly. The foaming agent can expand the heat moldable material. During the outward motion, the lower open-topped mold can maintain close contact with the heat moldable material, and the upper mold can maintain close contact with the heat moldable material. The expansion rate of the relative outward motion can be based upon the pressure signal.

In yet another embodiment, a system for forming aggregate materials may include a lower open-topped mold, an upper mold, an actuation assembly, a heating system, a cooling system, a pressure sensor, and a controller. The lower open-topped mold can receive a heat moldable material including a foaming agent. The upper mold can cooperate with the lower open-topped mold to form an enclosure. The actuation assembly can be coupled to the lower open-topped mold, the upper mold, or both to generate relative inward motion between the lower open-topped mold and the upper mold and relative outward motion between the lower open-topped mold and the upper mold. The heating system can be in thermal communication with the lower open-topped mold and the upper mold. The cooling system can be in thermal communication with the lower open-topped mold and the upper mold. The pressure sensor can be operably coupled to the lower open-topped mold, the upper mold, or both. The pressure sensor can transmit a pressure signal indicative of back pressure provided by the heat moldable material. The controller can be communicatively coupled to the actuation assembly, the heating system, and the cooling system. When the heat moldable material is received by the lower open-topped mold, the controller can execute machine readable control logic to generate relative inward motion of the lower open-topped mold and the upper mold with the actuation assembly to enclose the heat moldable material. The lower open-topped mold can contact the heat moldable material and the upper mold contacts the heat moldable material. The controller can execute machine readable control logic to heat the lower open-topped mold and the upper mold to a pre-heat temperature with the heating system. The pre-heat temperature may fuse the heat moldable material and not activate the foaming agent. The controller can execute machine readable control logic to heat the lower open-topped mold and the upper mold from the pre-heat temperature to a foaming temperature with the heating system. The foaming temperature can activate the foaming agent. The controller can execute machine readable control logic to receive the pressure signal from the pressure sensor. The controller can execute machine readable control logic to generate relative outward motion of the lower open-topped mold and the upper mold at an expansion rate with the actuation assembly. The foaming agent can expand the heat moldable material. During the outward motion, the lower open-topped mold can maintain close contact with the heat moldable material, and the upper mold can maintain close contact with the heat moldable material. The expansion rate of the relative outward motion can be based upon the pressure signal. The controller can execute machine readable control logic to cool the lower open-topped mold and the upper mold from the foaming temperature with the cooling system. The controller can execute machine readable control logic to generate relative inward motion of the lower open-topped mold and the upper mold at a contraction rate with the actuation assembly. During the inward motion, the lower open-topped mold can maintain close contact with the heat moldable material, and the upper mold can maintain close contact with the heat moldable material. The contraction rate of the relative outward motion can be based upon the pressure signal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As used herein with the various illustrated embodiments described below, the following terms include, but are not limited to, the following meanings.

The term "sensor" means a device that detects a physical quantity and converts it into a signal that is correlated to the detected value of the physical quantity.

The term "signal" means a waveform (e.g., electrical, optical, magnetic, or electromagnetic waveforms) capable of traveling through a medium such as DC, AC, sinusoidal-wave, triangular-wave, square-wave, and the like.

The phrase "communicatively coupled" means that components are capable of exchanging data signals with one another such as, for example, electrical signals via conductive medium, electromagnetic signals via air, optical signals via optical waveguides, and the like.

Figure 1:
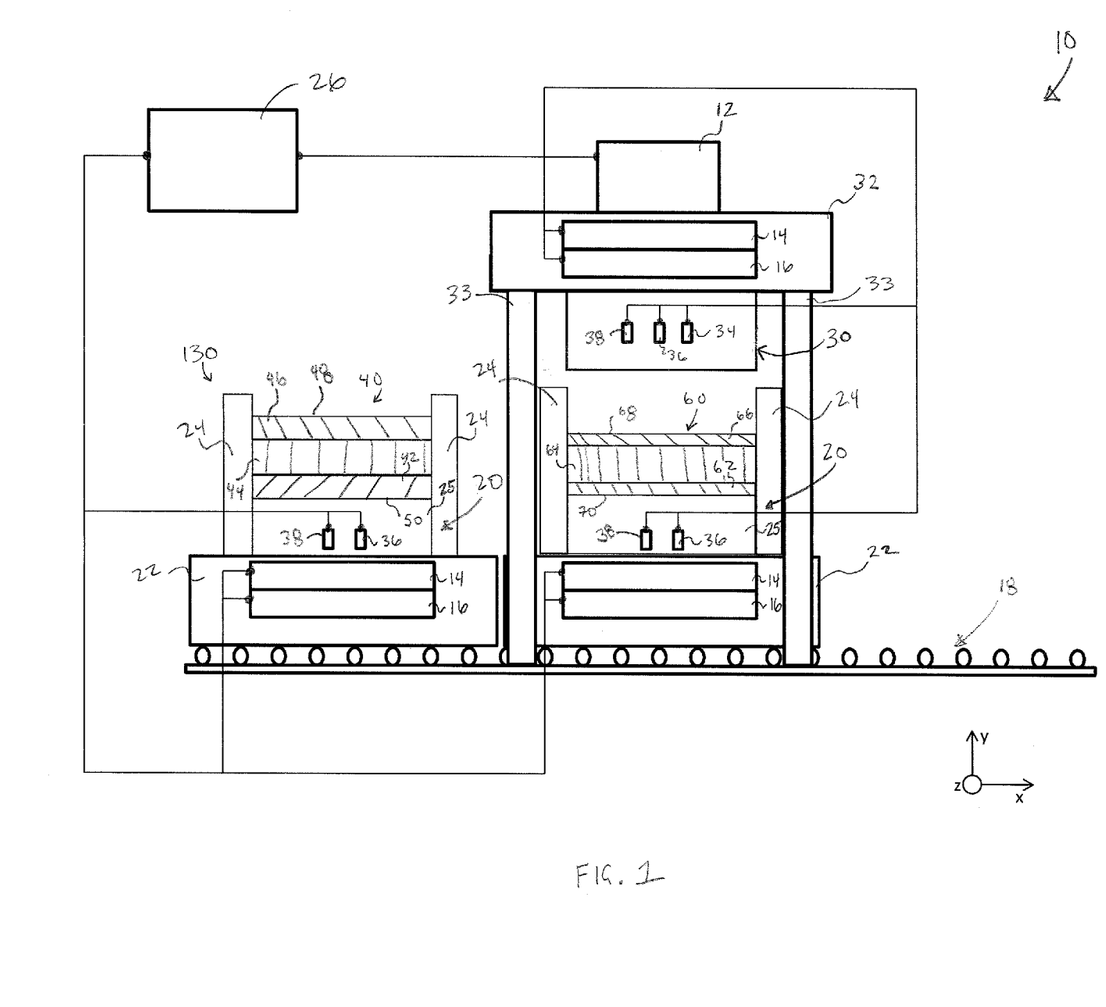
FIG. 1 schematically depicts a system for forming aggregate materials according to one or more embodiments shown and described herein.

FIG. 1 generally depicts one embodiment of a system for forming aggregate materials. The system generally comprises an upper mold, a lower open-topped mold, an actuation assembly for generating relative motion between the molds and a heating system for heating the molds. Various embodiments of the system for forming aggregate materials and the operation of the system will be described in more detail herein.

Referring now to FIG. 1, the system 10 may comprise a lower open-topped mold 20 for imparting a shape upon a raw material. The lower open-topped mold 20 can comprise one or more sidewalls 24 that that are configured to surround raw material that is shaped by the mold and a base 25 that cooperates with the one or more sidewalls 24 to form a mold shape. The lower open-topped mold 20 may be coupled to a lower support structure 22 that is capable of supporting the lower open-topped mold 20 and withstanding repeated actuation, as is described in greater detail herein.

The system 10 may further comprise an upper mold 30 that cooperates with the lower open-topped mold 20 to impart a shape upon a raw material. For example, the upper mold 30 and the lower open-topped mold 20 may cooperate and interlock such that a raw material is substantially enclosed throughout a molding process. The upper mold 30 may be coupled to an upper support structure 32 that is capable of durably supporting the upper mold 30 for multiple molding cycles, i.e., the molds may be used in repeated cycles to produce a high volume of molded articles. The lower open-topped mold 20 and the upper mold 30 may be formed from any material suitable to withstand repeated thermodynamic cycling while maintaining a substantially controlled shape such as, for example, a metallic (e.g., aluminum) or ceramic. Furthermore, it is noted that the lower support structure 22 and the upper support structure 32 may be formed from similar materials as the lower open-topped mold 20 and the upper mold 30 or any other material having substantially similar or lower thermal conductivity.

Referring still to FIG. 1, the system 10 may further include an actuation assembly 12 for generating relative motion between the lower open-topped mold 20 and the upper mold 30. Specifically, the actuation assembly 12 can be utilized to control the position of the lower open-topped mold 20 and the upper mold 30 to allow raw material to be loaded into the lower open-topped mold 20. Moreover, the actuation assembly 12 may provide pressure to the lower open-topped mold 20 and the upper mold 30 while the raw material is being shaped by the lower open-topped mold 20 and the upper mold 30. The actuation assembly 12 may include any number of actuators capable of transferring a controlled amount of force upon the lower open-topped mold 20, the upper mold 30, or both. For example, such actuators may be pneumatic, electrical, hydraulic, or any other device capable of transforming an input signal into motion. Moreover, each actuator may be linear or rotary. In some embodiments, the actuation assembly 12 may comprise a linear actuator disposed at each corner of a square shaped support structure coupled to upper mold 30.

The system 10 may comprise a heating system for providing thermal energy to an endothermic molding process. Specifically, the heating system may include a plurality of heating devices 14 in thermal communication with the lower open-topped mold 20 and the upper mold 30 that cause the raw material to achieve a higher temperature. The heating devices may be electrical resistive heating elements, inductive heating elements, or any other device capable of transferring a substantially even amount of thermal energy across a surface of the raw material and/or a surface of a mold. The thermal energy can be produced by the heating devices 14 and then transferred to the raw material by conduction, convection or radiation. Accordingly, it is noted that while, the heating devices 14 are depicted FIG. 1 as being located within the upper support structure 32 and the lower support structure 22, the heating devices 14 may be located external to the upper support structure 32, the lower support structure 22, the upper mold 30 and/or the lower open-topped mold 20. The heating devices 14 may alternatively or additionally be located within the upper mold 30 and/or the lower open-topped mold 20.

The system 10 may further comprise a cooling system for reducing the temperature of the raw material. For example, the cooling system may include a plurality of cooling devices 16 in thermal communication with the lower open-topped mold 20 and the upper mold 30. The cooling devices 16 may be flow paths through which a cooling fluid is directed to remove heat from the raw material, or any other device capable of removing thermal energy from the raw material by conduction, convection or radiation. Furthermore, it is noted that while, the cooling devices 16 are depicted FIG. 1 as being located within the upper support structure 32 and the lower support structure 22, the cooling devices 16 may be located external to the upper support structure 32, the lower support structure 22, the upper mold 30 and/or the lower open-topped mold 20. The cooling devices 16 may alternatively or additionally be located within the upper mold 30 and/or the lower open-topped mold 20.

The system 10 may further comprise a pressure sensor 34 for measuring the back pressure provided by the raw material during a molding process. Accordingly, the pressure sensor 34 may be any sensor capable of detecting the resistive force of the raw material during processing such as, but not limited to, a load cell, a force transducer, an absolute pressure sensor, a gauge pressure sensor, or a differential pressure sensor. It is noted that, while the pressure sensor 34 is depicted as being located within the upper mold 30, the pressure sensor 34 may be located anywhere in the system 10 such that the pressure sensor is operable to detect the back pressure of the raw material such as, for example, within the lower open-topped mold 20, the upper mold 30, the upper support structure 32, the lower support structure 22, the actuation assembly 12, or combinations thereof.

The system 10 may also comprise a position sensor 36 for detecting the position of the lower open-topped mold 20 and/or the upper mold 30. Specifically, the absolute and/or relative position of each of the lower open-topped mold 20 and the upper mold 30 may be detected along a single axis or multiple axes. Accordingly, the position sensor 36 may be any sensor capable of detecting linear and/or angular position such as an encoder, an optical sensor, an electrical sensor, and the like. It is noted that, while the position sensor 36 is depicted as being located within the upper mold 30 and the lower open-topped mold 20, the position sensor 36 may be located anywhere in the system 10 such that the position sensor 36 is operable to detect the lower open-topped mold 20 and the upper mold 30 such as, for example, within the actuation assembly 12, the lower open-topped mold 20, the upper mold 30, the upper support structure 32, the lower support structure 22, the actuation assembly 12, or combinations thereof.

The system 10 may comprise a temperature sensor 38 for detecting the temperature of the raw material. The temperature sensor 38 may be any sensor capable of detecting the temperature of the raw material directly or indirectly by measuring the temperature of the other components of the system 10. The temperature sensor 38 may include any device capable of detecting temperature such as, but not limited to, a thermometer, a thermocouple, a thermostat, infrared detector, and the like. It is noted that, while the temperature sensor 38 is depicted as being located within the upper mold 30 and the lower open-topped mold 20, the temperature sensor 38 may be located anywhere in the system 10 such that the temperature sensor 38 is operable to detect the temperature of and/or in thermal communication with the raw material such as, for example, within the lower open-topped mold 20, the upper mold 30, the upper support structure 32, the lower support structure 22, the actuation assembly 12, or combinations thereof.

The system 10 comprises a controller 26 for executing machine readable instructions to control various aspects of the molding process. The controller 26 may be a processor, an integrated circuit, a microchip, a computer, programmable logic controller or any other computing device capable of executing machine readable instructions. The controller 26 may be communicatively coupled to a memory such as RAM, ROM, EPROM, EEPROM, a flash memory, a hard drive, or any device capable of storing machine readable instructions. Accordingly, the memory may store molding control logic and/or process recipes.

Thus, embodiments of the present disclosure may comprise control logic or an algorithm written in any programming language of any generation (e.g., 1GL, 2GL, 3GL, 4GL, or 5GL) such as, e.g., machine language that may be directly executed by the controller, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as implemented via either a field-programmable gate array (FPGA) configuration or an application-specific integrated circuit (ASIC), and their equivalents.

Referring still to FIG. 1, one embodiment of the system 10 for forming aggregate materials is depicted. The system 10 may comprise an upper support structure 32 that is configured to move up and down a vertical axis (depicted in FIG. 1 as the y-axis). For example, the upper support structure 32 may be slidingly engaged with a plurality of vertical risers 33. The actuation assembly 12 can be coupled to the upper support structure 32 to transport the upper support structure 32 vertically. The system 10 may further comprise a lower support structure 22 that can be positioned below the upper support structure 32. Accordingly, when the upper support structure 32 moves along the vertical axis, the distance between the upper support structure 32 and the lower support structure 22 can be adjusted by the actuation assembly 12.

As is noted above, an upper mold 30 may be coupled to the upper support structure 32 and a lower open-topped mold 20 may be coupled to the lower support structure 22. Accordingly, the actuation assembly 12 can generate relative inward motion between the lower open-topped mold 20 and the upper mold 30 and relative outward motion between the lower open-topped mold 20 and the upper mold 30. Specifically, in the embodiment depicted in FIG. 1, the actuation assembly 12 may move the upper support structure 32 in the negative y-direction to cause relative inward motion between the lower open-topped mold 20 and the upper mold 30. The actuation assembly 12 may move the upper support structure 32 in the positive y-direction to cause relative inward motion between the lower open-topped mold 20 and the upper mold 30.

Thusly, the actuation assembly 12 may move the upper mold 30 throughout a range of positions that may include and be bounded by an open position and a clamped position. In the open position, the upper mold 30 can be moved away from the lower open-topped mold 20 such that the upper mold 30 is separated from the from the lower open-topped mold 20 along the y-axis. In the clamped position, the actuation assembly 12 forces the upper mold 30 into contact with the lower open-topped mold 20 such that further motion of the upper mold 30 along the negative y-direction is limited by the lower open-topped mold 20. It is noted that, while the actuation assembly 12 is depicted in FIG. 1 as being coupled to the upper support structure 32, the actuation assembly 12 may alternatively or additionally be coupled to any component of the system 10 such as the lower support structure 22, or any other component sufficient to allow the upper mold 30 and the lower open-topped mold 20 to move throughout an open position, a clamped position, and/or any position there between.

In some embodiments, the system 10 may comprise a conveyance system 18 for moving the lower support structure 22 laterally (depicted in FIG. 1 as along the x-axis). Accordingly, the lower open-topped mold 20 can be moved in and out of alignment with the upper mold 30. Furthermore, it is noted that, while the conveyance system 18 is depicted in FIG. 1 as a roller conveyer, the conveyance system 18 may be any motive system capable of moving the lower support structure 22. For example, the conveyance system 18 may include belts, enclosed tracks, I-Beams, towlines, and/or manually actuated rollers and/or wheels. Moreover, it is noted that, while the conveyance system 18 is depicted in FIG. 1 as being linear and accommodating two lower support structures 22, the conveyance system 18 may be any shape and may accommodate any number of lower support structures 22 for batch processing of aggregate materials.

The controller 26 can be communicatively coupled to various components of the system 10 and execute machine readable control logic to shape raw material into an aggregate material. In some embodiments, the controller 26 can be communicatively coupled to the actuation assembly 12, heating devices 14, cooling devices 16, pressure sensors 34, position sensors 36 and temperature sensors 38. Accordingly, the controller 26 follow control logic to direct the system 10 in forming a heat moldable material 40 into an aggregate material 60 according to a process recipe.

The heat moldable material 40 may be a thermoplastic such as, for example, polyolefins (e.g. polyethylenes, styrenics such as polystyrene, polyesters such as PET), thermosets (e.g. phenolics) and rubbers. The heat moldable material 40 generally comprises a temperature and/or a chemically activated foaming agent (blowing agent) such as, for example, exothermics, endothermics, and/or physical systems. Accordingly, the foaming agent may have an activation temperature at which the foaming agent forms a foam which causes expansion of the heat moldable material 40. Suitable exothermics include, but are not limited to, azodicarbonamide (e.g., Porofor® available from Lanxess or Celogen® available from Lion Copolymer), or sodium bicarbonate. Suitable endothermics include, but are not limited to, hydroxypropane tricarboxylic acid (e.g. Hydrocerol® available from Clariant). Physical systems can include for example nitrogen, pentane, or other gases, which can be preimpregnated in polystyrene or expanded polypropylene and released as a gas. Alternatively, nitrogen can be utilized in a system such as a "Zotefoam" nitrogen saturation process.

The heat moldable material 40 may comprise one or more distinct layers. For example, the heat moldable material 40 may comprise a lower layer 42, an upper layer 46 and a core layer 44 disposed between the lower layer 42 and the upper layer 46. The lower layer 42 may comprise relatively fine grain material that forms a lower surface 50. Similarly, the upper layer 46 may comprise relatively fine grain material that forms an upper surface 48. The fine grain material can be a thermoplastic powder (e.g. polyethylene) where the average grain size is about 100 µm to about 3,000 µm in one embodiment, and in another embodiment, for example, from about 500 µm to about 100 µm. Accordingly, heat moldable material 40 may be processed as described herein to form an aggregate material 60 having a lower skin layer 62 formed from the lower layer 42 and an upper skin layer 66 formed from the upper layer 46. It is believed, without being bound to theory, that the relatively fine grain material conforms more completely to the upper mold 30 and the lower open-topped mold relatively closely. Accordingly, the upper surface 68 and lower surface 70 may be made relatively smooth with smooth molds or may be made to more closely replicate the desired mold shape (e.g., to simulate natural stone, brick, timber, or any other building material).

The core layer 44 of the heat moldable material 40 may comprise a foaming agent. In some embodiments, the core layer may be formed from a relatively coarse grain material compared to the lower layer 42 and the upper layer 46. The coarse grain material can be a thermoplastic powder (e.g. polyethylene) where the average grain of up to about 10 mm. Moreover, the core layer may further comprise filler material such as, for example, recycled material (e.g., paper, cardboard, rubber, plastics, metal, fibers and minerals), glass fiber, carbon fiber, reinforcement steel mesh, organic fiber (e.g., bamboo or banana), or material intended to add specific properties (e.g., fire-retardant material or anti-ballistic material). Accordingly, the core layer 44 may comprise thermoplastics, foaming agents, and filler material in proportions suitable to allow the core layer 44 to fuse with the lower layer 42 and the upper layer 46 to form an aggregate material 60.

Figure 2A:
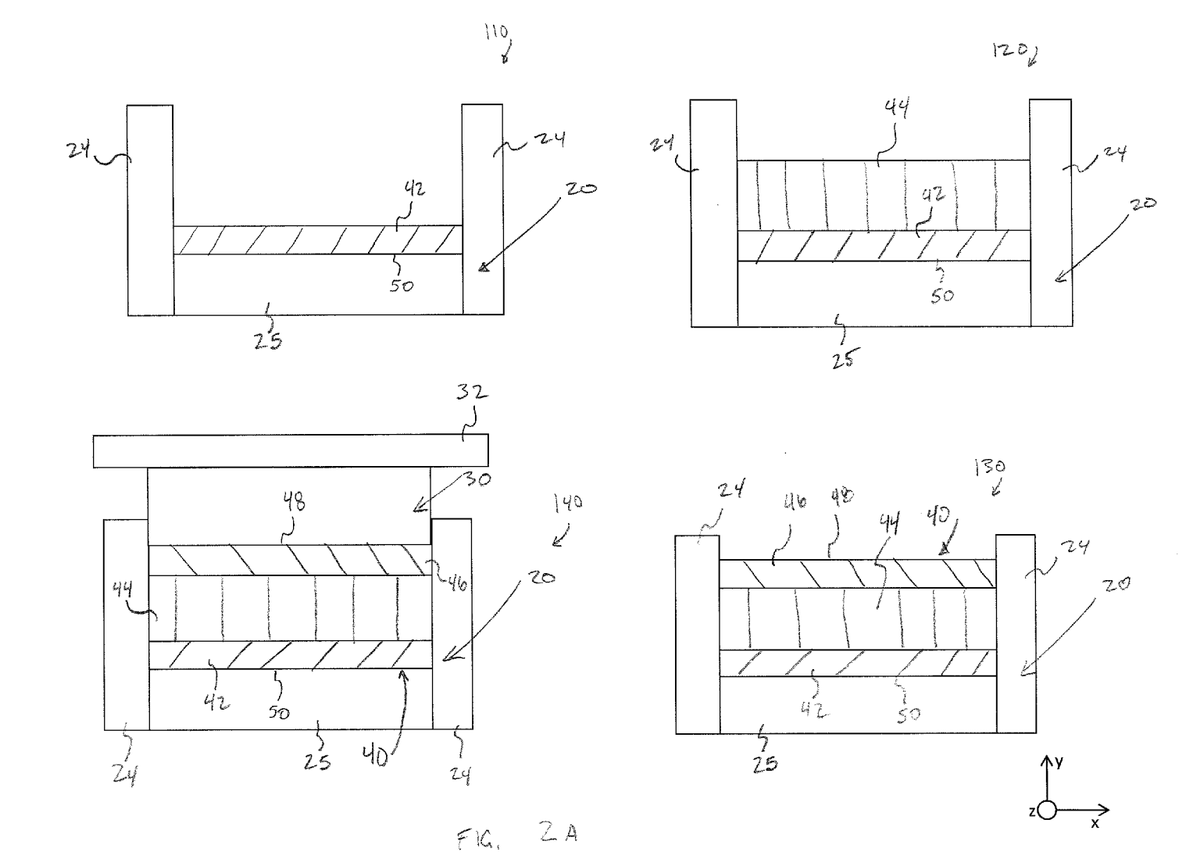
FIG. 2A schematically depicts a process for forming aggregate materials according to one or more embodiments shown and described herein.
Figure 2B:
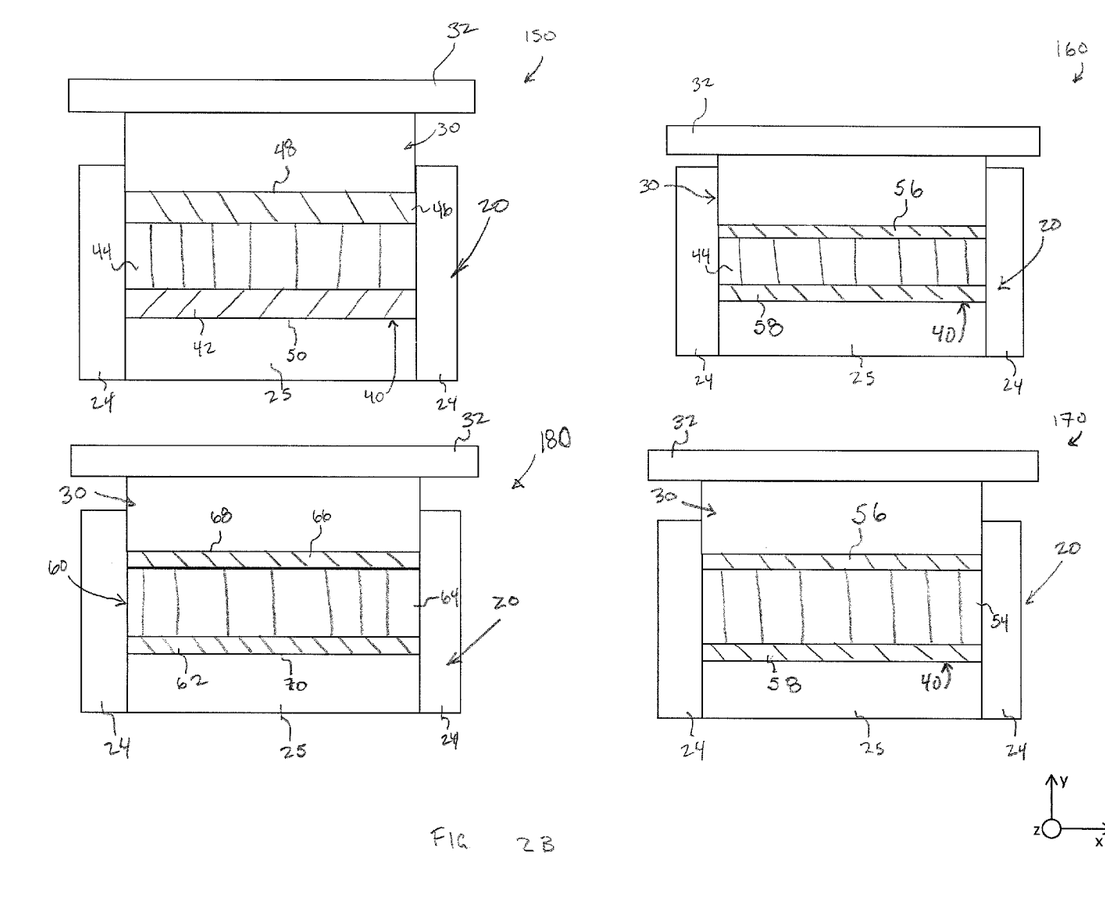
FIG. 2B schematically depicts a process for forming aggregate materials according to one or more embodiments shown and described herein.

Referring collectively to FIGS. 2A and 2B, one embodiment of a method for forming an aggregate material is schematically depicted. At step 110, the lower layer 42 can be dispensed into the lower open-topped mold 20, such that the lower surface 50 is in contact with the lower open-topped mold 20. At step 120, the core layer 44 can be dispensed into the lower open-topped mold 20 over the lower layer 42. As is noted above, the core layer 44 may include foaming agents and filler material. The foaming agent and/or the filler material may be pre-mixed with the core layer 44 and dispensed simultaneously as a constituent of the core layer 44. Additionally or alternatively, each of the core layer 44 constituents can be dispensed as individual layers.

At step 130, the upper layer 46 can be dispensed into the lower open-topped mold 20 over the core layer 44. Each of the lower layer 42, the core layer 44, and the upper layer 46 can be dispensed into the lower open-topped mold by a powder dispensing unit (not depicted). The powder dispensing unit can be any device capable of loading measured amounts of fine grain material and/or coarse grain material. In some embodiments, the sidewalls 24 and the base 25 of the lower open-topped mold 20 can move vertically with respect to one another to assist with the loading of the heat moldable material 40. For example, the sidewalls 24 may be lowered to a predetermined location with respect to the base 25 when one or more layers of the heat moldable material 40 are dispensed. A roller or a plane tool may be indexed by the sidewalls 24 and remove excess material that extends above the sidewall 24 to ensure the desired amount of material is loaded in the lower open-topped mold 20.

Referring back to FIG. 1, it is noted that, the heat moldable material 40 may be dispensed into the lower open-topped mold 20, when the lower open-topped mold 20 is not aligned with the upper mold 30. Accordingly, heat moldable material 40 may be loaded into one or more lower open-topped molds 20 by one or more powder dispensing units, while another lower open-topped mold 20 is aligned with the upper mold 30.

Referring collectively to FIGS. 1 and 2A, at step 140 a lower open-topped mold 20 housing the heat moldable material 40 may be aligned with the upper mold 30. For example, position sensors 36 may detect the orientation of the lower open-topped mold 20 and the upper mold 30 along the x-axis and the z-axis. When the lower open-topped mold 20 and the upper mold 30 are detected as being aligned by the position sensors 36, the controller 26 can cause the actuation assembly 12 to generate relative inward motion of the lower open-topped mold 20 and the upper mold 30. The upper mold 30 can be lowered into contact with the upper surface 48 of the heat moldable material 40, and the lower open-topped mold 20 can contact the lower surface 50 of the heat moldable material 40. Accordingly, the heat moldable material 40 can be enclosed by the lower open-topped mold 20 and the upper mold 30.

Referring collectively to FIGS. 1 and 2B, the embodiments described herein may optionally include step 150 and step 160. At step 150, the lower open-topped mold 20 and the upper mold 30 can be heated with the heating system to a pre-heat temperature. The pre-heat temperature may be any temperature wherein the lower layer 42 and the upper layer 46 fuses into a viscous material and the foaming agent remains below its activation temperature. For example, in one embodiment, the pre-heat temperature can be up to about 350° C., in another embodiment, such as for example, from about 130° C. to about 310° C., in still another embodiment, from about 190° C. to about 220° C., and in yet another embodiment, about 170° C. At step 160, the lower layer 42 can be fused into a viscous lower layer 58 and the upper layer 46 can be fused into a viscous upper layer 56. The controller 26 can cause the actuation assembly 12 to generate relative inward motion between the lower open-topped mold 20 and the upper mold 30.

Figure 3:
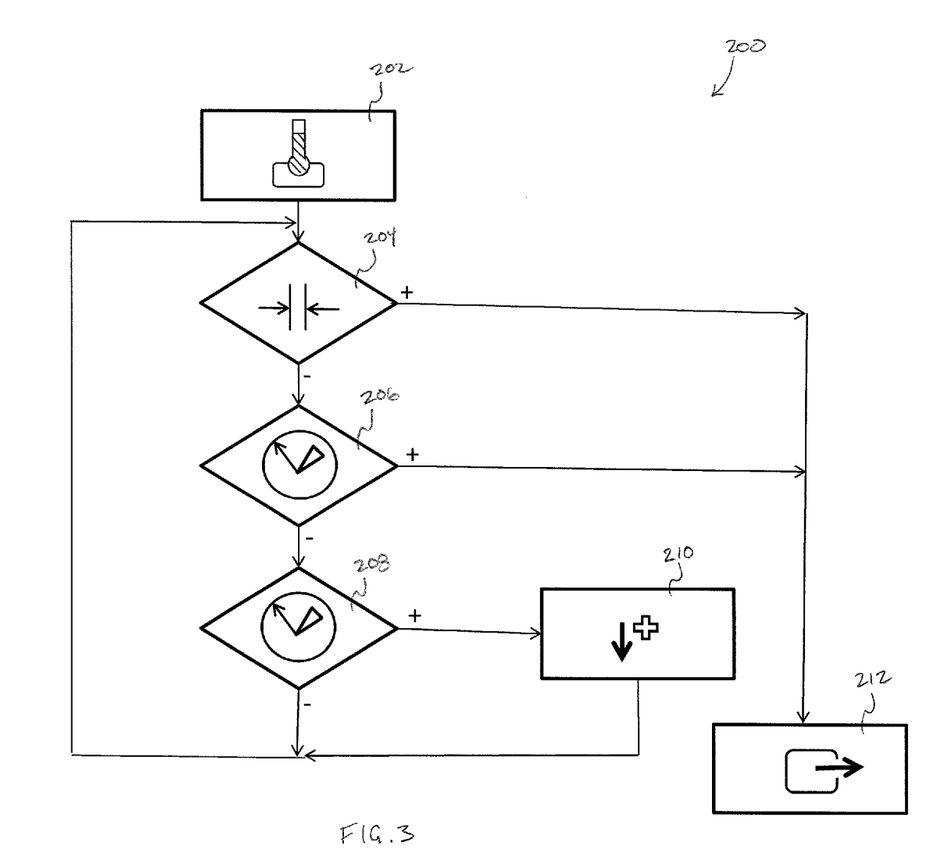
FIG. 3 depicts a flow chart of exemplary control logic for forming aggregate materials according to one or more embodiments shown and described herein.

Referring collectively to FIGS. 1 and 3, the viscous lower layer 58 and the viscous upper layer 56 can be formed according to a flow process 200. At step 202, the lower open-topped mold 20 and the upper mold 30 can be heated to the pre-heat temperature. At step 204, the controller 26 can receive a position measurement from the position sensor 36. The controller 26 can determine if the position indicates that the combined thickness of the fusing material has reached a desired thickness. The desired thickness can be set in accordance with the process recipe and can be about 10 mm for a process recipe for making a building board. If the measured thickness is less than or equal to the desired thickness (indicated in FIG. 3 with a "+"), the controller 26 can cause the flow process to proceed to step 212. At step 212, the flow process ends.

If the measured thickness is greater than the desired thickness (indicated in FIG. 3 with a "−"), the controller 26 can cause the flow process 200 to proceed to step 206. At step 206, the controller 26 can receive a force measurement from the pressure sensor 34. The controller 26 can determine if the force measurement exceeds a flow force limit. The flow force limit can be set in accordance with the process recipe and can be from about 0.2 kN to about 1 kN in one embodiment, and in another embodiment, for example, about 0.5 kN such as for a process recipe for making a building board. If the force measurement exceeds the flow force limit (indicated in FIG. 3 with a "+"), the controller 26 can cause the flow process to proceed to step 212. If the force measurement does not exceed the flow force limit (indicated in FIG. 3 with a "−"), the controller 26 can cause the flow process to proceed to step 208.

At step 208, the controller 26 can receive a force measurement from the pressure sensor 34. The controller 26 can determine if the force measurement is less than the flow force limit. If the force measurement is less than the flow force limit (indicated in FIG. 3 with a "+"), the controller 26 can cause the flow process to proceed to step 210. At step 210, the controller 26 can cause the actuation assembly 12 to incrementally move to generate relative inward motion between the lower open-topped mold 20 and the upper mold 30. The size of the increment may be set such that in operation the molds move at a desired rate. The desired rate can be set in accordance with the process recipe. The desired rate can be less than about 2 mm/minute in one embodiment, and in another embodiment, for example, about 1.6 mm/min (about 0.026 mm/sec) such as for a process recipe for making a building board. If the force measurement is not less than the flow force limit (indicated in FIG. 3 with a "−"), the controller 26 can cause the flow process to proceed back to step 204.

Referring again to FIG. 2B, the upper mold 30 and the lower open-topped mold 20 can be heated to a foaming temperature at step 170. The foaming temperature can be any temperature suitable to cause the foaming agent to reach its activation temperature. For example, the foaming agent can be heated to its activation temperature causing the core layer 44 to transform into a foam 54. In some embodiments, filler material can be inserted into the foam 54 through the sidewalls 24 of the lower open-topped mold 20. As the foam 54 expands, the foam exerts a force (i.e., back pressure) upon the upper mold 30 and the lower open-topped mold 20. The upper mold 30 and the lower open-topped mold 20 can be moved outward with respect to one another based upon the back pressure. Accordingly, the lower open-topped mold 20 and the upper mold 30 can maintain close contact with the heat moldable material 40.

Figure 4:
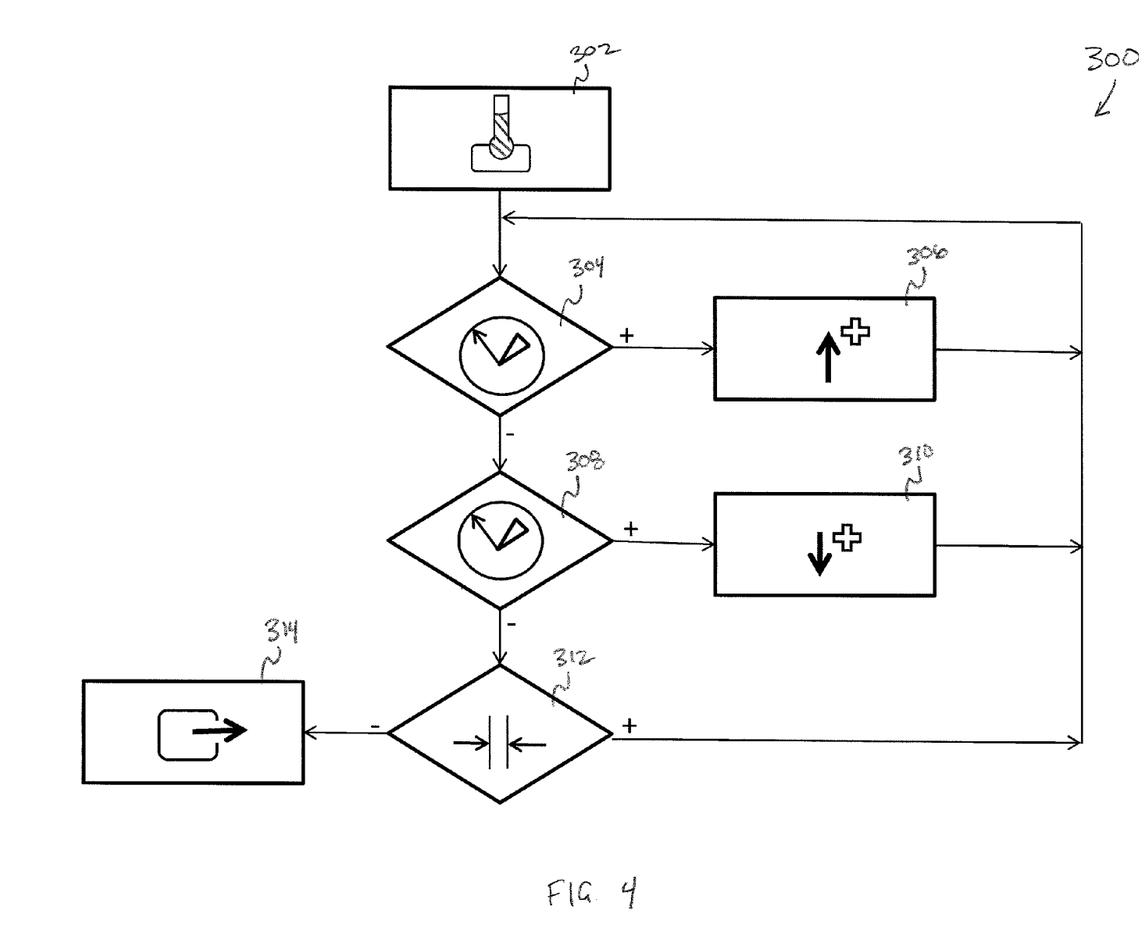
FIG. 4 depicts a flow chart of exemplary control logic for forming aggregate materials according to one or more embodiments shown and described herein.

Referring collectively to FIGS. 1 and 4, the foam 54 can be formed according to a foam process 300. At step 302, the lower open-topped mold 20 and the upper mold 30 can be heated to the foaming temperature. The foaming temperature may be any temperature wherein the heat moldable material 40 fuses and the foaming agent reaches its activation temperature. For example, in one embodiment the foaming temperature can be up to about 350° C., in another embodiment, such as for example, from about 140° C. to about 280° C., in still other embodiment from about 190° C. to about 220° C., and about 210° C. in yet another embodiment.

At step 304, the controller 26 can receive a foam force measurement from the pressure sensor 34. The controller 26 can determine if the foam force measurement exceeds a foam force limit plus a foam tolerance. The foam force limit and the foam tolerance can be set in accordance with the process recipe. The foam force limit can be in one embodiment from about 1 kN to about 20 kN, and in another embodiment, for example, about 0.5 kN such as for a process recipe for making a building board. The foam tolerance can be in one embodiment from about 0 kN to about 5 kN, and in another embodiment, for example, about 0.2 kN such as for a process recipe for making a building board. If the foam force measurement exceeds the foam force limit plus the foam tolerance (indicated in FIG. 5 with a "+"), the controller 26 can cause the foam process 300 to proceed to step 306. At step 306, the controller 26 can cause the actuation assembly 12 to incrementally generate relative outward motion between the lower open-topped mold 20 and the upper mold 30. The size of the increment may be set such that in operation the molds move at an expansion rate sufficient to respond to the rate of expansion of the foaming agent at the foaming temperature. Following step 306, the controller 26 can cause the foam process 300 to proceed to step 304.

If the foam force measurement does not exceed the foam force limit plus the foam tolerance (indicated in FIG. 4 with a "−"), the controller 26 can cause the flow process to proceed to step 308. At step 308, the controller 26 can receive a foam force measurement from the pressure sensor 34. The controller 26 can determine if the foam force measurement is less than a foam force limit minus the foam tolerance. If the foam force measurement is less than the foam force limit minus the foam tolerance (indicated in FIG. 5 with a "+"), the controller 26 can cause the foam process 300 to proceed to step 310. At step 310, the controller 26 can cause the actuation assembly 12 to incrementally generate relative inward (i.e., bringing together) motion between the lower open-topped mold 20 and the upper mold 30. The size of the increment may be set such that in operation the molds move at a contraction rate sufficient to respond to the rate of contraction of the foaming agent during the foaming process. Following step 310, the controller 26 can cause the foam process 300 to proceed to step 304.

If the foam force measurement is greater than the foam force limit minus the foam tolerance (indicated in FIG. 4 with a "−"), the controller 26 can cause the foam process 300 to proceed to step 312. At step 312, the controller 26 can receive a position measurement from the position sensor 36. The controller 26 can determine if the position indicates that the heat moldable material 40 is less than a nominal thickness plus a foam offset. The nominal thickness and the foam offset can be set in accordance with the process recipe. For example, the nominal thickness can be in one embodiment from about 5 mm to about 50 mm, in another embodiment about 8 mm to about 20 mm, and in still another embodiment, for example, about 8 mm such as for a process recipe for making a building board. The foam offset can be in one embodiment from about 0.2 mm to about 1.5 mm, and in another embodiment, for example, about 1 mm such as for a process recipe for making a building board. If the measured thickness is less the heat moldable material 40 is less than a nominal thickness plus a foam offset (indicated in FIG. 5 with a "+"), the controller 26 can cause the foam process 300 to proceed back to step 304.

If the measured thickness of the heat moldable material 40 is greater than or equal to the nominal thickness plus the foam offset (indicated in FIG. 4 with a "−"), the controller 26 can cause the foam process 300 proceed to step 314. At step 314, the foam process 300 ends.

Referring again to FIG. 2B, the upper mold 30 and the lower open-topped mold 20 can be cooled to a cooling temperature at step 180. The cooling temperature can be any temperature suitable to solidify the aggregate material 60 into a stable product for handling or further processing. For example, the cooling temperature can be in one embodiment from about 30° C. to about 80° C., and in another embodiment, for example, about 50° C. such as for a process recipe for making a building board.

As the foam 54 is cooled, the foam 54 may contract to reduce the back pressure upon the upper mold 30 and the lower open-topped mold 20. The upper mold 30 and the lower open-topped mold 20 can be moved inward with respect to one another based upon the back pressure. Accordingly, the lower open-topped mold 20 and the upper mold 30 can maintain close contact with the heat moldable material 40 during cooling, for example, as discussed hereafter. It is to be appreciated that by close contact it is meant that the upper mold 30 maintains contact substantially over the entire surface area of the upper surface 48 of the building material during at least the cooling process such that bowing i.e., distortion/movement of portions of the cooling building material in or out of the general contours defined by the facing surfaces of the upper and lower molds, is substantially prevented.

Figure 5:
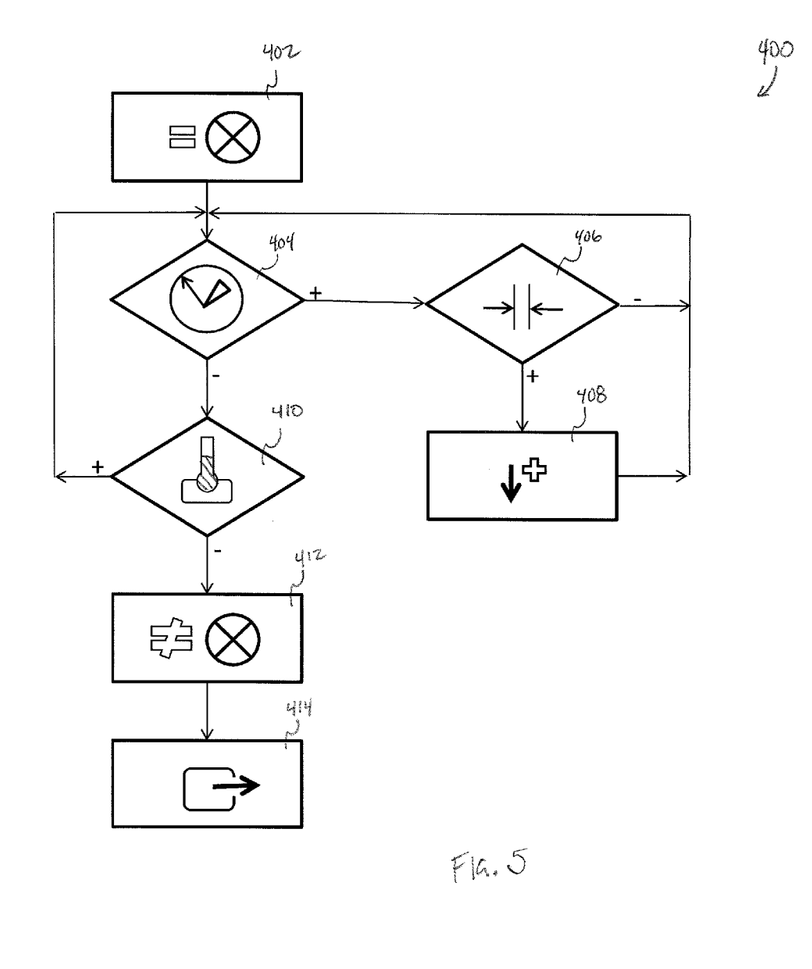
FIG. 5 depicts a flow chart of exemplary control logic for forming aggregate materials according to one or more embodiments shown and described herein.

Referring collectively to FIGS. 1 and 5, the heat moldable material 40 can be cooled according to a cooling process 400. At step 402, cooling devices 16 may be activated by the controller 26 to cool the lower open-topped mold 20 and the upper mold 30. At step 404, the controller 26 can receive a cooling force measurement from the pressure sensor 34. The controller 26 can determine if the cooling force measurement is less than the foam force limit. If the cooling force measurement is less than the foam force limit (indicated in FIG. 5 with a "+"), the controller 26 can cause the cooling process 400 to proceed to step 406. If the cooling force measurement is greater than or equal to the foam force limit (indicated in FIG. 5 with a "−"), the controller 26 can cause the cooling process 400 to proceed to step 410.

At step 406, the controller 26 can receive a position measurement from the position sensor 36. The controller 26 can determine if the position indicates that the heat moldable material 40 is greater than a nominal thickness. If the measured thickness is greater than the nominal thickness (indicated in FIG. 5 with a "+"), the controller 26 can cause the cooling process 400 to proceed to step 408. If the measured thickness is less than or equal to the nominal thickness (indicated in FIG. 5 with a "−"), the controller 26 can cause the cooling process 400 to proceed back to step 404.

At step 408, the controller 26 can cause the actuation assembly 12 to incrementally generate relative inward motion between the lower open-topped mold 20 and the upper mold 30. The size of the increment may be set such that, in operation, the molds move at a rate sufficient to respond to the rate of contraction of the foaming agent during the cooling process. Following step 408, the controller 26 can cause the cooling process 400 to proceed back to step 404.

At step 410, the controller 26 can receive a temperature measurement from the temperature sensor 38. The controller 26 can determine if the temperature measurement indicates that the heat moldable material 40 is greater than the cooling temperature. If the temperature measurement is greater than the cooling temperature (indicated in FIG. 5 with a "+"), the controller 26 can cause the cooling process 400 to proceed back to step 404. If the temperature measurement is less than or equal to the cooling temperature (indicated in FIG. 5 with a "−"), the controller 26 can cause the cooling process 400 to proceed to step 412. At step 412, the cooling devices 16 may be deactivated by the controller 26. The cooling process 400 can then proceed to step 414, where the cooling process 400 terminates.

It is to be appreciated that the above described process may be used in one embodiment according to a process recipe for making a building board, that is also described above, to form such building boards having a total thickness of about 18 mm (about ¾ inch), skin layers from about 1 to about 1 ½ mm thick and a core layer about 15 mm thick. Such building boards can be made up to about 10 cm total thickness with skin layers from about 0.5 mm to about 7 mm thick following the described process recipe. It is noted that various attributes of the process recipe such as, but not limited to, temperatures, forces, thicknesses, inward increments, and outward increments can be adjusted to achieve other desired output aggregate materials, such as for example, simulate natural stone, simulated natural brick, simulated stone veneer, simulated brick veneer, tile, simulated natural timber, siding, engineered lumber, and any other such desired manufactured/composite/layered building material. Moreover, it is noted that the process recipe may depend upon the attributes (e.g., size, shape, amount, proportion, chemistry) of the fine grain material, the coarse grain material, the foaming agent, and/or the filler material.

Referring again to FIG. 1, a heat moldable material 40 may be formed, as described herein, into an aggregate material 60 comprising a lower skin layer 62, an upper skin layer 66, and a core layer 64 integrally formed there between. The lower skin layer 62 can form a lower surface 70 and the upper skin layer 66 can form an upper surface 68. Each of the lower surface 70 and the upper surface 68 can be formed into a desired shape according to the molding systems described herein. The core layer 64 may have cellular voids formed therein, which may yield a relatively light structure, e.g., as compared to a corresponding natural building material. Moreover, the core layer may be impregnated with filler material as described herein.

The aggregate material 60 can be removed from the system 10 via ejector pins (not depicted) integral with the lower open-topped mold 20 and/or the upper mold 30. Alternatively or additionally, the lower open-topped mold 20 and/or the upper mold 30 can be heated by the heating system to a temperature that facilitates removal. In some embodiments, the base 25 and the sidewalls 24 of the lower open-topped mold may move relative to one another to eject the aggregate material 60. For example, the base 25 may slide vertically. In embodiments where the sidewalls 24 are shaped to impart features upon the aggregate material 60 (e.g., tongues and/or grooves), the sidewalls 24 may be removed and or rotate about the base 25. It is noted that the aggregate materials 60 can be formed with a batch processing layout where powder dosing, mold interlocking, heating, pressing, cooling, and/or removal are each performed at separate locations along a production line and/or by different machines.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Furthermore, it is noted that the embodiments described herein have been provided with an xyz coordinate system for clarity. Accordingly, the xyz coordinate system can be transformed into any other coordinate system without departing from the scope of the description. Moreover, directional terms such as vertical, lateral, inward, outward, and the like have been described with respect to the provided coordinate system and are not intended to be limiting.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for forming aggregate materials comprising:
   enclosing a heat moldable material with a lower open-topped mold and an upper mold, wherein the heat moldable material comprises a foaming agent;
   heating the heat moldable material to a foaming temperature, wherein the foaming temperature fuses the heat moldable material and activates the foaming agent;
   detecting back pressure provided by the heat moldable material as the foaming agent expands the heat moldable material with a pressure sensor, wherein the pressure sensor is operably coupled to the lower open-topped mold, the upper mold, or the lower open-topped mold and the upper mold;
   receiving a pressure signal indicative of the back pressure with a controller;
   determining, automatically with the controller, an expansion rate based upon the pressure signal;
   generating relative outward motion of the lower open-topped mold and the upper mold at the expansion rate, wherein the lower open-topped mold maintains close contact with the heat moldable material and the upper mold maintains close contact with the heat moldable material as the heat moldable material expands;
   cooling the heat moldable material from the foaming temperature to a cooling temperature, wherein the heat moldable material contracts;
   detecting the back pressure provided by the heat moldable material as the heat moldable material contracts;
   determining, automatically with the controller, a contraction rate based upon the pressure signal; and
   generating relative inward motion of the lower open-topped mold and the upper mold at the contraction rate, wherein the lower open-topped mold maintains close contact with the heat moldable material and the upper mold maintains close contact with the heat moldable material as the heat moldable material contracts, whereby an aggregate material is formed.

2. The method of claim 1, wherein the cooling temperature is from about 50° C. to about 80° C.

3. The method of claim 1, further comprising:
   heating the heat moldable material to a pre-heat temperature, wherein the pre-heat temperature fuses the heat moldable material and does not activate the foaming agent.

4. The method of claim 3, wherein the pre-heat temperature is from about 130° C. to about 310° C.

5. The method of claim 1, wherein the heat moldable material comprises a lower layer and an upper layer, and a core layer disposed between the lower layer and the upper layer such that the core layer comprises filler material.

6. The method of claim 5, wherein the filler material comprises recycled material, glass fiber, carbon fiber, reinforcement steel mesh, or organic fiber.

7. The method of claim 5, wherein the filler material comprises fire-retardant material or anti-ballistic material.

8. The method of claim 1, wherein the heat moldable material comprises a thermoplastic.

9. The method of claim 1, wherein the heat moldable material comprises a thermoset.

10. The method of claim 1, wherein the heat moldable material comprises rubber.

11. The method of claim 1, wherein the aggregate material is formed such that the aggregate material comprises a surface that is substantially smooth.

12. The method of claim 1, wherein the aggregate material is formed such that the aggregate material comprises a surface that is shaped to simulate stone, brick, tile, timber, siding, or engineered lumber.

13. The method of claim 1, wherein the heat moldable material comprises a powder.

14. The method of claim 13, wherein the powder has an average grain size of up to about 10 mm.

15. The method of claim 13, wherein the powder has an average grain size of about 100 μm to about 3,000 μm.

16. The method of claim 1, wherein the lower open-topped mold comprises one or more sidewalls that are shaped to impart features upon the aggregate material.

17. The method of claim 16, wherein the features imparted upon the aggregate material comprises a tongue or a groove.

* * * * *

UNITED STATES PATENT AND TRADEMARK OFFICE
CERTIFICATE OF CORRECTION

PATENT NO. : 9,522,491 B2  
APPLICATION NO. : 14/332487  
DATED : December 20, 2016  
INVENTOR(S) : Peter Aylmore et al.

Page 1 of 1

It is certified that error appears in the above-identified patent and that said Letters Patent is hereby corrected as shown below:

On the Title Page

Item (75) delete:
"Peter Aylmore, Riga (LV);
Simon Wiper, Dilton Marsh Washbury (GB)"

Should read:
--Peter Aylmore, Riga (LV);
Simon Wiper, Dilton Marsh Westbury (GB)--

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*